United States Patent [19]

Henne

[11] Patent Number: 4,699,036
[45] Date of Patent: Oct. 13, 1987

[54] CUTTING APPARATUS

[75] Inventor: Herbert Henne, Ehingen, Fed. Rep. of Germany

[73] Assignee: G.O. Stumpf GmbH & Co. KG, Mehrstetten, Fed. Rep. of Germany

[21] Appl. No.: 807,298

[22] Filed: Dec. 10, 1985

[30] Foreign Application Priority Data

Dec. 21, 1984 [DE] Fed. Rep. of Germany ....... 3446899

[51] Int. Cl.[4] .............................................. B26D 1/06
[52] U.S. Cl. ....................................... 83/847; 83/615; 30/392; 30/394; 74/44
[58] Field of Search ..................... 30/392, 394; 83/615, 83/748, 747; 144/35 A; 74/44

[56] References Cited

U.S. PATENT DOCUMENTS

| 1,643,721 | 9/1927 | Meyer | 30/394 |
| 2,639,737 | 5/1953 | Forsberg | 30/392 |
| 3,448,781 | 6/1969 | Angelucci | 30/392 |

FOREIGN PATENT DOCUMENTS

| 1960473 | 9/1971 | Fed. Rep. of Germany . | |
| 2805012 | 8/1979 | Fed. Rep. of Germany | 30/394 |
| 1168877 | 9/1958 | France . | |

Primary Examiner—Donald R. Schran
Attorney, Agent, or Firm—Scully, Scott, Murphy & Presser

[57] ABSTRACT

Cutting apparatus (15) for cutting-out stacks of sheet material such as fabric has a guide (55) for a reciprocating cutter (16), driven by a drive mechanism (18) arranged in a housing (19). The housing (19) is mounted on a carrier (8) extending above a cutting-out table (2). The cutter (16) is driven from an eccentric (38) arranged on a rotary member (36). A counterweight (41) is driven from a second eccentric (39) with an eccentricity (e) which is oppositely directed to the eccentricity (e) of the first eccentric (38) driving the cutter (16), to compensate for inertial forces generated by the mass of the cutter (16). The cutting apparatus (15) is free of turning moments acting substantially in a plane lying in the axis (36) of the rotary member (32), by arranging the eccentrics (38, 39) in a turning plane (E₁) on the two rotary members (32, 33), the members (32, 33) lying one behind the other with respect to the cutting direction (34) of the cutter (16) and rotating at the same speed as each other.

7 Claims, 3 Drawing Figures

CUTTING APPARATUS

FIELD OF THE INVENTION

This invention relates to cutting apparatus for cutting out stacks of sheet material such as fabric, using a reciprocating cutter, for example a cutter of the type sometimes known as a trevette or velvet knife.

BACKGROUND OF THE INVENTION AND PRIOR ART

Cutting apparatus for this purpose may comprise a guide for the cutter, and a drive mechanism arranged in a housing which is mounted on a carrier extending above a cutting-out table. The cutter is driven from an eccentric mounted on a rotary member, and a counterweight is driven from a second eccentric with an eccentricity which is oppositely directed to the eccentricity of the first eccentric driving the cutter, to compensate for inertial forces generated by the mass of the cutter.

Cutting apparatus of this construction is described and shown in DE-PS No. 19 60 473. With the known construction the inertial forces generated by the reciprocating movement of the cutter, in operation, can be counterbalanced by the counterweight, but a turning moment remains, which acts substantially in a plane containing the axis of the rotary member. The turning moment is determined by the construction of the known design and is transferred via the housing to the carrier as a load.

The object underlying the present invention is to design a reciprocating cutting apparatus which is free from turning moments effective substantially in a plane containing the axis of the rotary member.

SUMMARY OF THE INVENTION

According to the present invention there is provided cutting apparatus for cutting sheet material, the apparatus comprising a drive mechanism for mounting on a carrier disposed above a cutting table supporting the sheet material, the drive mechanism comprising a first rotary member provided with an eccentric which is connected to a counterweight, the eccentrics being oppositely disposed with respect to each other so that the counterweight counterbalances inertial forces of the cutter, the eccentrics rotating, in operation, in a common plane, and the rotary members being disposed one behind the other with respect to the direction of a cutting stroke of the cutter and being rotatable at the same speed as each other.

With the design according to the invention both eccentrics are arranged in a common turning plane. This is made possible because the two rotary members are disposed one behind the other in the thrust direction of the cutter, the eccentrics being provided on these rotary members without hindering each other. The arrangement of the eccentrics in a common turning plane opens up two possibilities in principle, to arrange the cutter or a connecting element joined to it, or the counterweight or a connecting element joined to it, so that no disadvantageous turning moment exists which is effective in the previously described fashion. It is possible to arrange the counterweight and the cutter in the turning plane, in which the eccentrics also lie. It is however, also possible to arrange the counterweight and cutter in a plane parallel to the turning plane in which the eccentrics lie. In such a case, however, the counterweight and the cutter must be the same distance as each other from the turning plane in which the eccentrics lie since, otherwise, the turning moments do not completely counterbalance each other and, according to the arrangement, an undesired residual turning moment remains in the previously described fashion. With an arrangement, displaced in the previously described fashion, of the counterweight and of the cutter to the eccentrics, turning moments do indeed also rise, but they substantially counterbalance each other.

As well as the previously described turning moments, which act in a plane containing the axes of the rotary members, turning moments can also arise, which lie in a plane which extends transversely of these axes and which also load the housing or the carrier, if they are not counterbalanced. These turning moments arise because the eccentrics rotate in a plane which extends transversely of the rotation axes and therefore act at different distances from the line of movement of the cutter or of the counterweight. In order to eliminate these turning moments as completely as possible, it is advantageous for the guides for the counterweight and the cutter to extend not only transversely of the axes of the rotary members, but also to be positioned longitudinally of these axes, in the same movement planes, i.e. to arrange them coaxially.

In order to achieve as narrow a construction as possible, it is recommendable to arrange the counterweight on the side of the drive mechanism away from the cutter. This design leads to a high profile housing, but this is to be preferred to a broad one for reasons of general layout.

A low friction drive for the counterweight and the cutter results if a connecting rod, serving as a transmission member, is provided between the eccentrics and, respectively the counterweight and the cutter.

By reason of their reciprocating movement, such connecting rods produce inertial forces which lead to the previously described transversely disposed turning moments. However, these turning moments can be more easily mastered, for example because the rotary members turn in the same direction as each other and therefore the turning moments substantially cancel each other. The decision as to which type of transmission should be used, for example, connecting rods or a cross slot for each respective eccentric, depends on the constructional factors and on the available space. An advantageous measure for driving the rotary members in the opposite direction as each other is to provide the rotary members with driven toothed wheels and to drive them from a common driving toothed wheel, which meshes with both of the driven toothed wheels.

With reciprocating cutting apparatus, the mass of the cutters can vary. Different masses come about on the one hand from regrinding of the cutter, or from the use of different cutter shapes, which can be necessary for various materials. It is therefore useful, for the purpose of adapting the counterweight to the available mass of the cutter, to arrange the counterweight so that it is exchangeable and accessible from outside. This purpose is also served by arranging the counterweight on the side of the drive mechanism away from the cutter, the housing being accessible from outside if necessary through a lid. A significant feature is that available counterweights can be fastened to the drive mechanism and removed from it again, so that the counterweights can be exchanged. Also of advantage is the measure to allow the counterweight to project out of the housing, so that it can be gripped without needing to open any lid. A further advantageous measure is to fasten the counterweight detachably to a guide rod which passes through the relevant wall of the housing.

DETAILED DESCRIPTION OF A PREFERRED EMBODIMENT

Figure 1:
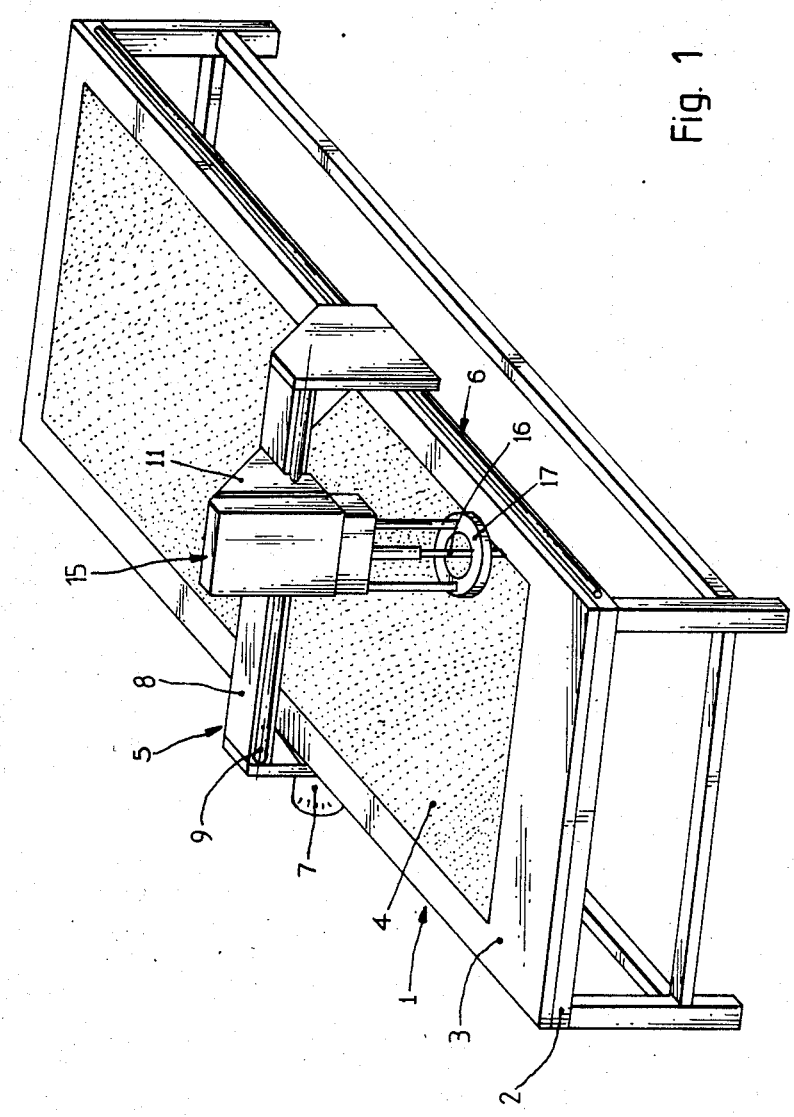
FIG. 1 shows an automatically controlled machine for cutting out material, with a reciprocating cutter.
Figure 2:
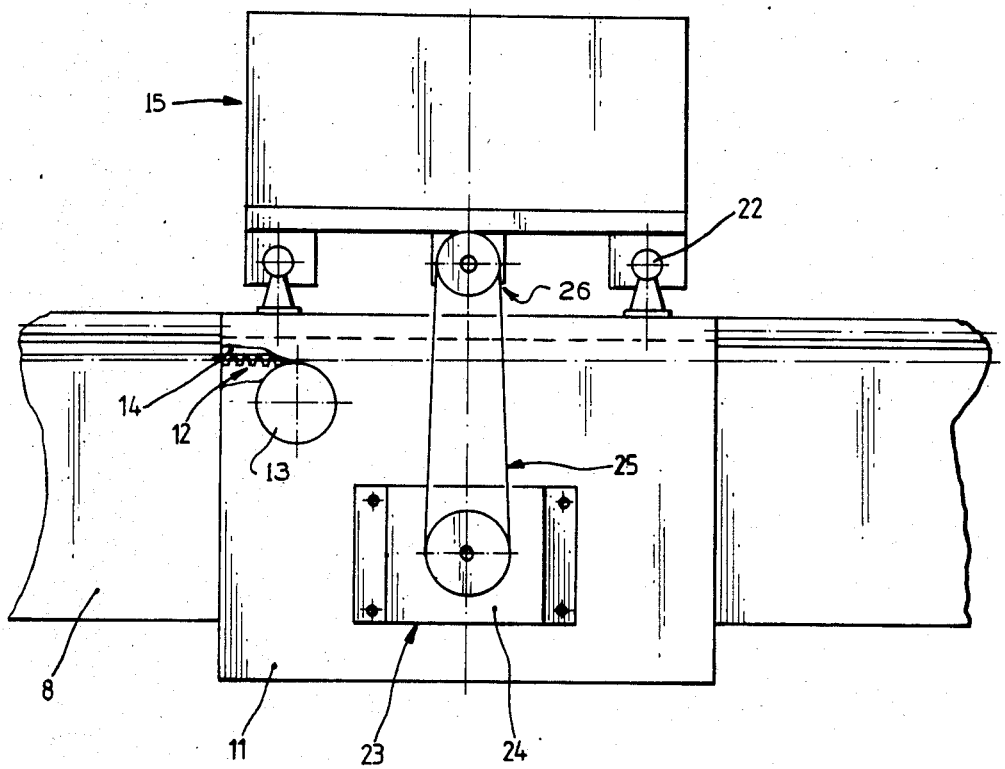
FIG. 2 is a plan view of the cutter.

The cutting out machine is generally denoted in FIG. 1 by the reference 1, and comprises a cutting-out table 2 having a surface 3 on which layers of material 4 are laid out for the purpose of cutting. A bridge 5 is movable over the surface 3 on guides 6 situated at the longitudinal sides of the cutting-out table 2. The bridge 5 is drivable by means of a longitudinal drive 7. The bridge 5 has a crosshead 8 on which a cross slide 11 can move horizontally and transversely of the cuttingout table 2, on guides 9. A transverse drive 12 is provided for this purpose and comprises a motor 13 on the cross slide 11 and a toothed rack 14 on the crosshead 8, as shown in FIG. 2.

The cutter is generally denoted by reference 15 and comprises a reciprocating knife 16, a hold-down clamp 17, a drive mechanism 18, arranged in a housing 19, for the lengthwise movement of the knife 16, and a drive mechanism 21 for turning movements of the knife 16. The housing 19 is guided on a guide 22 for vertical movement on the crosshead 8. A vertical drive 23, for this purpose, comprises a motor 24, a toothed belt pinion 25 and a spindle pinion 26, as shown in outline in FIG. 2.

The power strokes of the knife 16 are effected by a motor 27 with a pinion 28. The pinion 28 meshes simultaneously with two toothed wheels 29, 31, which are fast with two rotary members 32, 33 supported in bearings 37 for turning about axes 35, 36. These axes 35, 36 extend transversely of the direction 34 of the power strokes and are disposed one behind the other in the direction 34. The rotary members 32, 33 carry eccentrics 38, 39. The eccentrics 38, 39 have the same eccentricity e as each other, but they are 180° out of phase with each other. The turning movements of the eccentrics 38, 39 are transferred to the knife 16 and to a counterweight 41 through connecting rods 42,43, which are pivotably supported on the eccentrics 38, 39 and on connecting pins 44, 45 of sliders 46, 47. The sliders 46, 47 are guided in guides 48, 49, which are aligned with the power stroke direction 34.

Figure 3:
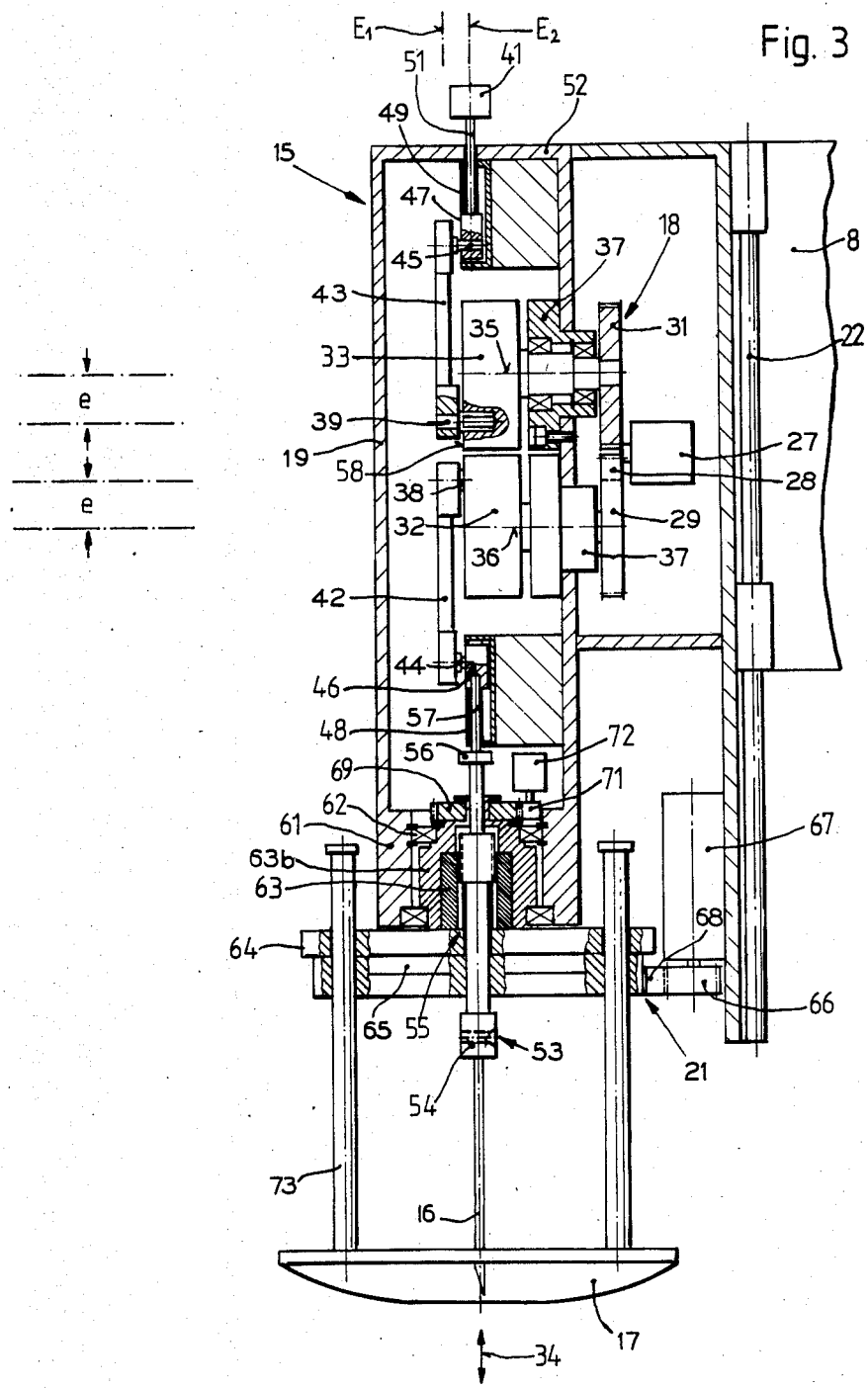
FIG. 3 shows the cutter in vertical section.

As shown in FIG. 3 the connecting rods 42, 43 extend in opposite directions to each other so that the counterweight 41 is on the side of the drive mechanism 18 away from the knife 16. The connecting rod 43 joined to the counterweight 41 extends upwardly from the eccentric 39. The counterweight 41 is mounted on a guide rod 51, which passes through the wall 52 of the housing 19.

The knife 16 is releasably mounted by a connecting device 53 on a knife holder 54, which is guided for lengthwise movement in a guide 55 which is aligned with the slider guides 48, 49 and is joined at a hinge 56 and a connecting link 57 to the slider 46.

In operation, the linkage components 42, 44, 46, 57 and 54, and the knife 16, and the linkage components 43, 45, 47 and 51, and the counterweight 41, produce opposite turning moments of equal magnitude and therefore balance each other out. The balancing out is achieved because the eccentrics 38, 39, which project from coplanar faces 58 of the rotary members 32, 33, lie, with the connecting rods 42, 43, in a movement plane $E_1$ while the counterweight 41 and the knife 16 lie in a movement plane $E_2$, in which the direction of the power stroke 34 also lies.

In the framework of the present invention it is possible, as long as space is available, to arrange the knife 16, the counterweight 41 and the connecting rods 42, 43 in a single movement plane.

The drive mechanism 21 for turning the knife 16, comprises a bearing bush 61, which is rotatably supported, by means of bearings 62, in the housing 19. A turn-resistant guide bush 63 is received in a sleeve supported by the bearing bush 61 and supports the knife 16 for lengthwise displacement with no rotation. Rotation is prevented by means of longitudinal grooves or ribs. The sleeve 63 is connected to a receiving plate 64 and a toothed wheel 65 to form a rigid turntable assembly. A drive pinion 66, which is mounted on the output shaft of a drive motor 67, is connected by a toothed belt 68 to the toothed wheel 65. A toothed wheel 69, which is fastened to the upper surface of the guide bush 63, meshes with a pinion 71 of a rotation recorder 72.

To turn the knife 16, torque is transferred to the knife holder 54 through the guide bush 63, while the respective turning position of the knife holder 54, and thus also of the knife 16, is monitored by the rotation recorder 72.

Two guide rods 73 of the hold-down clamp 17 pass through the receiving plate 64 to provide a guide for the hold-down clamp 17 which can turn through 360°.

When in operation to cut out fabric, the knife 16 reciprocates vertically. At the same time it is driven, under the control of a control device which is not shown, along a pre-set cutting pattern outline, and thus moves both longitudinally and transversely of the cutting-out table 2 and, at the same time, is turned about the knife axis in order to be able to follow the cutting pattern.

The cutter 15, in the illustrated embodiment, comprises a cutting head of the cutting-out machine 1. The blade 16 can, as well, be formed as a stabbing cutter. It is also possible for the cutter to be constructed in accordance with DE-PS No. 19 60 473.

I claim:

1. Cutting apparatus for cutting sheet material, the apparatus comprising a cutter supported for upward and downward reciprocating movement on a cutting axis, and a drive mechanism drivingly connected to the cutter and mountable on a carrier disposed above a cutting table supporting the sheet material, the drive mechanism comprising:

a first rotary member provided with an eccentric, a second rotary member provided with an eccentric, and a lower guide member located below the first rotary member, an upper guide member located above the second rotary member, a lower slider supported within the lower guide member for upward and downward reciprocating movement on the cutting axis, the cutter being connected to the lower slider for reciprocating movement therewith, an upper slider supported by the upper guide member for upward and downward reciprocating movement on an axis aligned with the cutting axis, a counterweight located directly above the cutter, connected to the slider, and supported by said slider for reciprocating movement on the axis co-linear with the cutting axis, and drivingly connected to the eccentric of the second rotary member, a lower connecting rod having a first end pivotally connected to the eccentric of the first rotary member, and having a second end pivotally connected to the lower slider to reciprocate the lower slider and the cutter on the cutting axis, an upper connecting rod having a first end pivotally connected to the eccentric of the second rotary member, and having a second end pivotally connected to the upper slider to reciprocate the upper slider and the counterweight on the axis co-linear with the cutting axis, the eccentrics being oppositely disposed with respect to each other so that the counterweight counterbalances inertial forces of the cutter, the eccentrics being adapted for rotation, in operation, in a common plane, and the rotary members being disposed one behind the other with respect to the direction of a cutting stroke of the cutter and being rotatable at the same speed as each other.

2. Cutting apparatus as claimed in claim 1, in which the rotary members rotate in the same direction as each other in operation.

3. Cutting apparatus as claimed in claim 1, further comprising driven toothed wheels to which the rotary members are respectively connected, the driven toothed wheels having the same number of teeth as each other and being drivingly connected to a common driving toothed wheel.

4. Cutting apparatus as claimed in claim 3, in which the driving toothed wheel meshes with both of the driven toothed wheels.

5. Cutting apparatus for cutting sheet material, the apparatus comprising a cutter and a drive mechanism drivingly connected to the cutter and mountable on a carrier disposed above a cutting table supporting the sheet material, the drive mechanism comprising:

a first rotary member provided with an eccentric drivingly connected to the cutter, a second rotary member provided with an eccentric, and a counterweight drivingly connected to the eccentric of the second rotary member, the eccentrics being oppositely disposed with respect to each other so that the counterweight counterbalances inertial forces of the cutter, the eccentrics being adapted for rotation, in operation, in a common plane, and the rotary members being disposed one behind the other with respect to the direction of a cutting stroke of the cutter and being rotatable at the same speed as each other, further comprising guides in which the counterweight and the cutter are moveable, the guides being aligned with each other, and wherein the counterweight is accessible from outside the apparatus for exchange or adjustment and is held on a guide rod, on which the counterweight is releasably mounted, and wherein the guide rod or the counterweight passes through a wall of a housing accomodating the drive mechanism.

6. Apparatus for cutting sheet material, comprising:
support means;

cutter means extending downward from the support means and supported by the support means for upward and downward reciprocating movement on a cutting axis;

drive means supported by the support means to reciprocate the cutter means;

first transmission means connecting the drive means to the cutter means to reciprocate the cutter means on the cutting axis, the first transmission means including
 (i) a first rotary member supported by the support means for rotation about a first rotary axis,
 (ii) means connecting the drive means to the first rotary member to rotate the first rotary member about the first rotary axis,
 (iii) a first eccentric element connected to the first rotary member, spaced from the first rotary axis, for rotation with the first rotary member about the first rotary axis, and
 (iv) a lower guide member located below the first rotary member,
 (v) a lower slider supported within the lower guide member for upward and downward reciprocating movement on the cutting axis, the cutter being connected to the lower slider for reciprocating movement therewith, and
 (vi) a lower connecting rod having a first end pivotally connected to the eccentric of the first rotary member, and having a second end pivotally connected to the lower slider to reciprocate the lower slider and the cutter on the cutting axis;

a counterweight located directly above the cutter means, and supported by the support means for upward and downward reciprocating movement on an axis co-linear with the cutting axis;

second transmission means connecting the drive means to the counterweight to reciprocate the counterweight on the axis co-linear with the cutting axis to counterbalance forces applied to the cutter means, the second transmission means including
 (i) a second rotary member supported by the support means for rotation about a second rotary axis, said second rotary axis being parallel to and directly above the first rotary axis,
 (ii) means connecting the drive means to the second rotary member to rotate the second rotary member about the second rotary axis at the same speed as the first rotary member,
 (iii) a second eccentric element connected to the second rotary member, spaced from the second rotary axis, for rotation with the second rotary member about the second axis,
 (iv) an upper guide member supported by the support means and located above the second rotary member,
 (v) an upper slider supported by the upper guide member for upward and downward reciprocating movement on the axis aligned with the cutting axis, and
 (vi) an upper connecting rod having a first end pivotally connected to the second eccentric element, and having a second end pivotally connected to the upper slider to reciprocate the upper slider and the counterweight on the axis co-linear with the cutting axis and to balance forces applied to the cutter means.

7. Apparatus for cutting sheet material, comprising:

support means including a housing;

cutter means extending downward from the support means and supported by the support means for upward and downward reciprocating movement on a cutting axis;

drive menas supported by and enclosed within the housing to reciprocate the cutter means;

first transmission means enclosed within the housing and connecting the drive means to the cutter means to transmit motion thereto from the drive means, the first transmission means including (i) a first rotary member supported by the support means for rotation about a first rotary axis, (ii) means connecting the drive means to the first rotary member to rotate the first rotary member about the first rotary axis, (iii) a first eccentric element connected to the first rotary member, spaced from the first rotary axis, for rotation with the first rotary member about the first rotary axis, and (iv) means connecting the first eccentric element to the cutter means;

a counterweight supported by the housing for upward and downward reciprocating movement on the cutting axis;

second transmission means enclosed within the housing and connecting the drive menas to the counterweight to transmit motion thereto from the drive means to counterbalance forces applied to the cutter means, the second transmission means including (i) a second rotary member supported by the support means for rotation about a second rotary axis, said second rotary axis being parallel to and directly above the first rotary axis, (ii) means connecting the drive means to the second rotary member to rotate the second rotary member about the second rotary axis, at the same speed as the first rotary member, (iii) a second eccentric element connected to the second rotary member, spaced from the second rotary axis, for rotation with the second rotary member about the second rotary axis, and (iv) means connecting the second eccentric element to the counterweight to reciprocate the counterweight and balance forces applied to the cutter means, and including (a) a slider supported by the housing for upward and downward reciprocating movement on the cutting axis, and extending upward through the housing to a location thereabove, and (b) a rod pivotally connected to the second eccentric element and to the slider to reciprocate the slider as the second eccentric element rotates around the second rotary axis; and wherein the counterweight is located outside the housing and is releasably secured to the slider to facilitate changing the counterweight.

* * * * *

UNITED STATES PATENT AND TRADEMARK OFFICE
CERTIFICATE OF CORRECTION

PATENT NO. : 4,699,036
DATED : October 13, 1987
INVENTOR(S) : Herbert Henne

It is certified that error appears in the above-identified patent and that said Letters Patent is hereby corrected as shown below:

In the Abstract, line 14: "of therotary" should read as --of the rotary--

Column 1, line 42: "with an eccentric which is" should read as --with an eccentric for driving a cutter of the cutting apparatus, and a second rotary member provided with an eccentric which is--

Signed and Sealed this

Seventeenth Day of May, 1988

Attest:

DONALD J. QUIGG

*Attesting Officer*      *Commissioner of Patents and Trademarks*